United States Patent [19]
Fukuma et al.

[11] 3,879,322
[45] Apr. 22, 1975

[54] FUEL BINDER FOR COMPOSITE PROPELLANT
[75] Inventors: Daizo Fukuma; Seiji Takeuchi, both of Tokorozawa; Kensho Shirota, Tokyo, all of Japan
[73] Assignee: Nissan Motor Company, Limited, Yokohama, Japan
[22] Filed: Dec. 6, 1973
[21] Appl. No.: 422,181

[30] Foreign Application Priority Data
Dec. 25, 1972 Japan.................................... 48-729

[52] U.S. Cl.......... 260/23.7 R; 149/19.9; 260/458 N
[51] Int. Cl.............................................. C08c 11/72
[58] Field of Search............ 260/23.7 R; 260/458 N; 149/19.9

[56] References Cited
UNITED STATES PATENTS
3,507,837  4/1970  Hidinger............................ 260/87.3

OTHER PUBLICATIONS
Skeist, "Handbook of Adhesives," 1962, pp. 255–259 relied on.

*Primary Examiner*—Donald E. Czaja
*Assistant Examiner*—William E. Parker
*Attorney, Agent, or Firm*—Frank J. Jordan

[57] ABSTRACT

In carboxyl-terminated polybutadiene fuel binders, tris 1-(2-methyl) aziridinyl phosphine oxide (MAPO) is converted into a bifunctional derivative with a fatty acid so that the catalytic effect of MAPO on the burning rate reduction is retained and the adverse effect on the elasticity of the cured polymer is eliminated.

3 Claims, No Drawings

FUEL BINDER FOR COMPOSITE PROPELLANT

The present invention relates to composite solid propellants and particularly to polybutadiene fuel binders for composite propellants of relatively low burning rates.

In the field of composite solid propellants for rockets, gas generators etc., it is still now a problem of great interest to provide a propellant of a relatively low burning rate without making sacrifice of its physical properties. Although some substances such as lithium fluoride, strontium carbonate and oxamide are known as catalysts for reducing the burning rate of composite propellants, the adverse effects of these catalysts on physical properties of the resulting propellants are almost inevitable and too significant to be ignored.

In carboxyl-terminated polybutadiene (CTPB) propellants, which have been holding an important part in the field due to their excellent physical properties over a wide temperature range, it is well known that a typical curing agent of CTPB, namely tris 1-(2-methyl) aziridinyl phosphine oxide (MAPO) has a remarkable effect of reducing the burning rate. However, the use of a large amount of MAPO to achieve a considerable reduction of the burning rate also causes the resulting propellants to have some undesirable physical properties such as a decreased elongation and increased Young's modulus. In short, a "rigid" propellant is always obtained when the burning rate is reduced by MAPO.

It is therefore an object of the present invention to provide a CTPB-based fuel binder for composite propellants of a relatively low burning rate and adequate elasticity.

Briefly stated, a fuel binder in accordance with the present invention comprises a carboxy-terminated polybutadiene, MAPO and a fatty acid so that at least a portion of MAPO is converted into a bifunctional derivative combined with the fatty acid. The bifunctional MAPO derivative, while retaining the catalytic nature of MAPO, has little influence on the elasticity of the propellant since it extends the polymer chains without cross-linking them.

MAPO serves as a curing agent of CTPB by cross-linking the polymer chains because it is a trifunctional imine. When, however, MAPO is used in order to reduce the burning rate in an amount larger than sufficient for an adequate degree of cross-linking, the cured binder has naturally an excessively cross-linked structure, losing a featuring property of CTPB binder, an adequate elasticity.

Despite this drawback, MAPO is considered too dominant to be abandoned both as a curing agent and as a burning rate reduction catalyst for CTPB. We have therefore contemplated to turn MAPO into a bifunctional derivative retaining the catalytic nature. The denaturation can be accomplished by opening one imine ring of MAPO with a monocarboxylic acid. When the acid is mixed with MAPO equimolarly, the reaction may be expressed as follows:

Preferably monocarboxylic acids are fatty acids, for example acetic acid, valeric acid, caproic acid, caprylic acid and oleic acid. Some aromatic acids, for example benzoic acid, may also be used. The obtained bifunctional MAPO derivative no longer works as a cross-linking agent for CTPB which has functional groups at the both ends of the linear chain, but acts as a chain extending agent. It retains the catalytic effect on the burning rate since the effect is attributed to the $O=PN_3$ structure.

The amount of MAPO to be added to 1 mole of CTPB is usually in the range of 0.7 to 1.0 mole when a relatively low burning rate is required. A fatty acid is added to MAPO according to the present invention in a molar ratio of 0.1 to 1.0. The amount of the acid is usually determined to leave a suitable amount of MAPO unreacted with the acid so that CTPB will be cured to a cross-linked structure corresponding to the required properties such as elongation and Young's modulus.

The denaturation of MAPO in accordance with the invention may be carried out either by mixing the three components of the fuel binder, namely a CTPB, MAPO and a monocarboxylic acid, all at once, or by treating MAPO alone with the acid prior to the mixing with a CTPB. If, in the former case, Y mole of MAPO is desired to be combined with X mole of a CTPB from a burning rate viewpoint (where $0.7X \leq Y \leq X$ as mentioned before), the amount of a monocarboxylic acid is determined to be equal or less than $(3Y - 2X)$ mole. In this instance, an oxidizer for composite propellants may be simultaneously mixed with the above three components of the fuel binder of the invention like a common propellant mixing process. When MAPO alone is treated with the acid in advance, calculated amounts of the denatured and untreated MAPO are mixed with a CTPB. If Y mole of total MAPO is required to X mole of a CTPB, at least $2(X - Y)$ mole of untreated MAPO is used in addition to at most $(3Y - 2X)$ mole of the denatured MAPO. In this instance, any suitable curing agent may be used instead of or in combination with untreated MAPO when, for example, the required total amount of MAPO is relatively small. The reaction of a monocarboxylic acid with an aziridine ring of MAPO occurs easily at room temperature to a slightly raised temperature of about 60°C.

To further illustrate the invention, the following non-limitative examples are presented.

EXAMPLE 1

A CTPB of about 3000 M.W., MAPO and caprylic acid were mixed all at once at room temperature in a molar ratio of 1 : 0.933 : 0.8.

A series of experiment was carried out to compare the burning rate and physical properties of a composite propellant prepared from the obtained fuel binder with those of similar propellants from the prior art fuel binders. The propellants were prepared by mixing the fol-

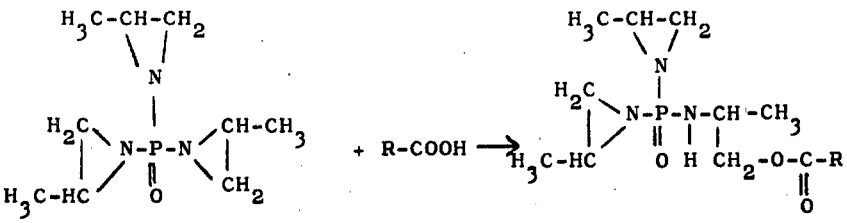

lowing constituents followed by heat curing at 60°C for 96 hr.

CTPB fuel binder . . . 19 parts by weight.

B-1; A mixture of a CTPB, MAPO and a bifunctional epoxy compound in a molar ratio of 1 : 0.567 : 0.15.

B-2; A mixture of a CTPB, and MAPO in molar ratio of 1 : 0.667.

B-3; A mixture of a CTPB, MAPO and caprylic acid in a molar ratio of 1 : 0.933 : 0.8 (Example 1).

Oxidizer (ammonium perchlorate) . . . 67 parts by weight. A mixture of equal parts by weight of coarse particles of about 350 microns mean particle size and fine particles of below 44 microns.

Auxiliary fuel (aluminum powder) . . . 14 parts by weight.

Fine particles of about 25 microns mean particle size. The results of the experiment are tabulated below.

| Fuel binder | B-1 | B-2 | B-3 |
| --- | --- | --- | --- |
| Tensile strength $kg/cm^2$ | 8.5 | 15 | 9.0 |
| Elongation % | 60 | 30 | 55 |
| Young's modulus $kg/cm^2$ | 40 | 90 | 60 |
| Burning rate mm/sec | 6.0 ± 0.3 | 5.0 ± 0.3 | 4.0 ± 0.3 |

Burning rates were measured at 50 $kg/cm^2$.

The advantage of a fuel binder of the invention (B-3) will be apparent from a comparison with B-2 (a prior art fuel binder for a low burning rate). When B-2 was used, the propellant became extraordinarily rigid despite only about 15 percent reduction in the burning rate from a standard fuel binder B-1. On the other hand, B-3 brought about a burning rate reduction of more than 30% with only a slight change in elasticity.

EXAMPLE 2

MAPO and valeric acid were mixed equimolarly and heated at 60°C for 3 hrs. The CTPB of Example 1, untreated MAPO and the valeric acid added MAPO were mixed in a molar ratio of 10 : 6 : 1. The properties of a propellant prepared with the same composition as in Example 1 using the fuel binder of Example 2 were comparable with the values shown in the column B-3 of the above table.

EXAMPLE 3

The steps of Example 2 were followed except that propionic acid was used in lieu of valeric acid.

EXAMPLE 4

Example 2 was again repeated using linoleic acid in lieu of valeric acid.

The burning rate and physical properties of propellants of the aforementioned composition prepared from the fuel binders of Examples 3 and 4 were substantially similar to those of the propellant from B-3 binder of Example 1 in spite of considerable differences in the chain length and bond structure of the fatty acids.

What is claimed is:

1. In a fuel binder for composite propellants, having a carboxyl-terminated polybutadiene and tris 1-(2-methyl) aziridinyl phosphine oxide, the improvement comprising at least a portion of said tris 1-(2-methyl) aziridinyl phosphine oxide being a bifunctional derivative thereof having the formula:

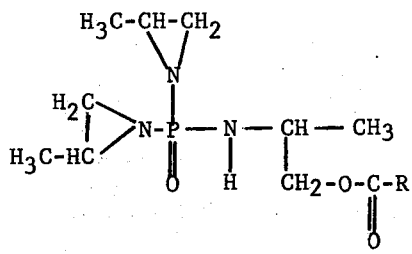

where R represents the hydrocarbon chain of a monocarboxylic acid, said portion having been formed by the addition of the chain of the monocarboxylic acid to one of the aziridine rings of said tris 1-(2-methyl) aziridinyl phosphine oxide.

2. A fuel binder as claimed in claim 1, in which the amount of said monocarboxylic acid is 10 to 100 mole per cent of said tris 1-(2-methyl) aziridinyl phosphine oxide.

3. A fuel binder as claimed in claim 1, in which said monocarboxylic acid has less than 20 carbon atoms.

* * * * *